Aug. 18, 1959 H. L. HASKETT 2,899,900
CONTROLLER FOR WATER SYSTEMS
Filed May 24, 1956 2 Sheets-Sheet 1
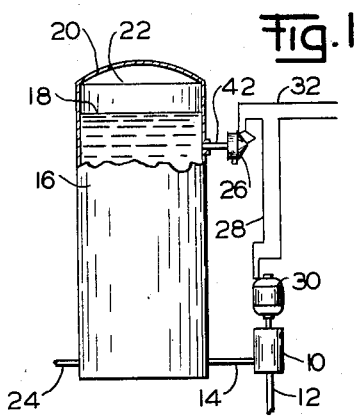
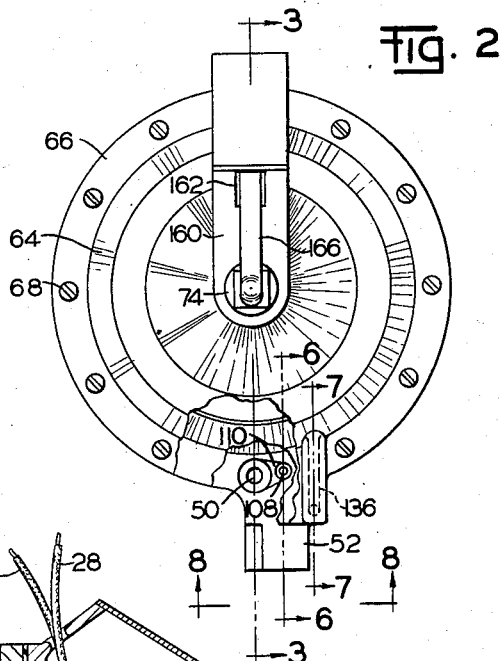
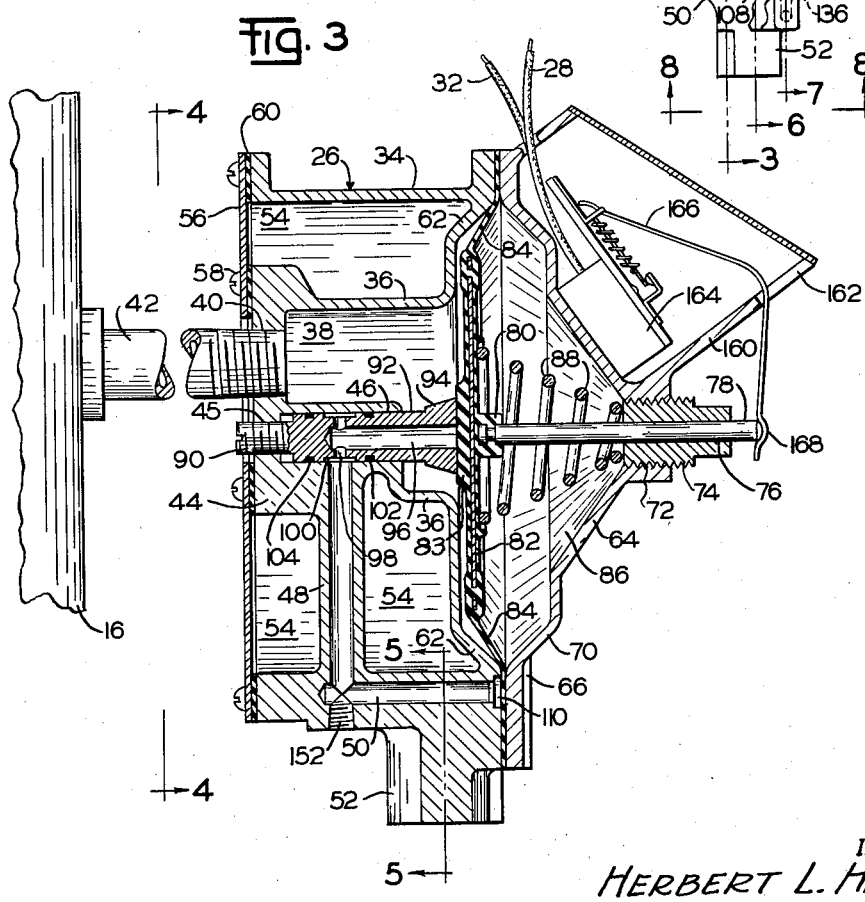
INVENTOR.
HERBERT L. HASKETT.
BY
Eugene C. Knoblock
ATTORNEY.

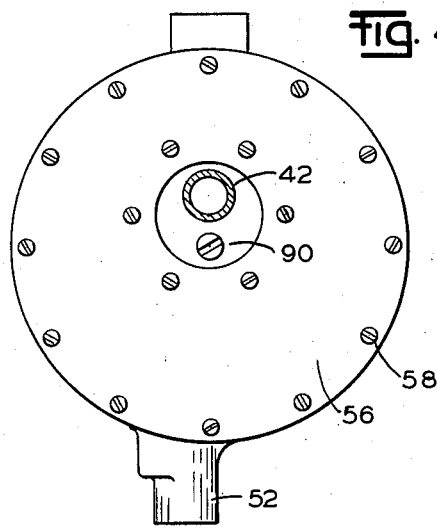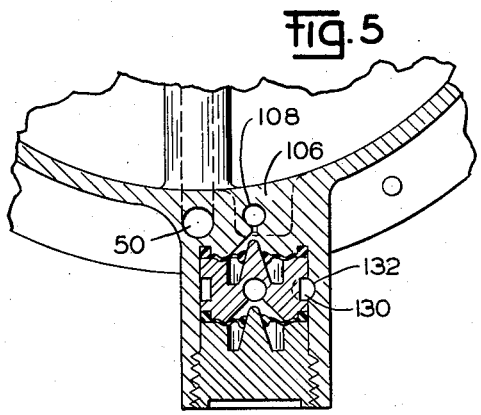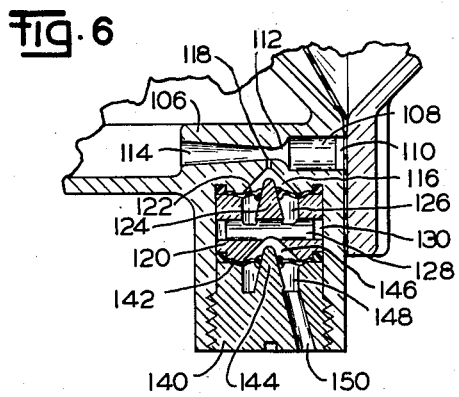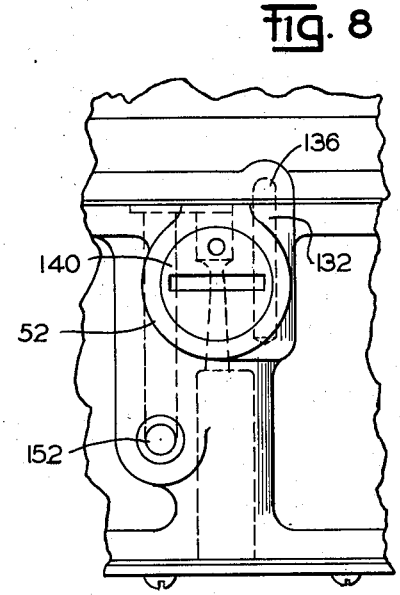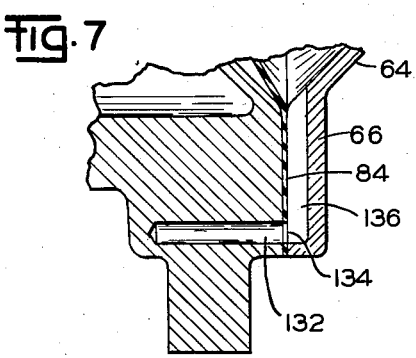

United States Patent Office 2,899,900
Patented Aug. 18, 1959

2,899,900

CONTROLLER FOR WATER SYSTEMS

Herbert L. Haskett, Stevensville, Mich.

Application May 24, 1956, Serial No. 587,092

13 Claims. (Cl. 103—6)

This invention relates to improvements in controllers for water systems, and more particularly to a controller for a domestic water system of the type employing a storage tank sealed at its top and having an air cushion for providing pressure discharge of water therefrom.

Heretofore it has been customary in a domestic water system to provide a pump, a storage tank, a pressure switch, and an air volume control. The inlet of the tank and its outlet are commonly situated near the bottom so that under normal conditions air is trapped in the upper section of the tank. This arrangement relies upon the compression of the air trapped at the top of the tank to provide the pressure which forces the water from the tank when a valve in the system to which the tank is connected is opened. The pressure switch is set to operate in response to water pressure to maintain the pressure in the tank between a predetermined minimum at which the switch energizes the pump motor and the predetermined maximum at which the pressure switch deenergizes the pump motor. The air volume control is required to maintain a sufficient volume of air within the tank to insure that the tank will not become completely filled with water and thus lose its air cushion which provides the discharge pressure. In other words, the air volume control insures that a quantity of air is trapped within the tank at all times and operates to replenish the air supply when that is necessary. The air volume control and the pressure switch are commonly separate elements, and the fact that they are separate increases the cost of a domestic water system and increases the likelihood of failure of the system.

It is the primary object of my invention to provide a controller for domestic water systems which will serve the function of controlling a pump motor by energizing the same when a predetermined minimum pressure condition exists and deenergizing the same when a predetermined maximum water pressure condition exists, and which serves automatically upon each actuation thereof to entrain air into the storage tank, so as to insure that an adequate volume of air is present in the tank at all times.

Another object is to provide a device of this character having a diaphragm which responds to the fluid pressure within a storage tank for the purpose of actuating a control switch for a pump motor and of pumping air into the water system.

A further object is to provide a device of this character having a novel construction of air valve associated with a bodily shiftable diaphragm and a liquid passage, for entraining air into a liquid-containing chamber.

A further object is to provide a device of this character having a novel, simple and inexpensive construction in which the parts are readily accessible for repair and replacement, and in which adjustment of the pressure setting of the device may be readily effected.

Other objects will be apparent from the following specification.

In the drawing:

Fig. 1 is a schematic view of a system employing my controller and having parts shown in section;

Fig. 2 is an end view of the controller with parts broken away;

Fig. 3 is a transverse sectional view taken on line 3—3 of Fig. 2;

Fig. 4 is an end view of the device at the end opposite that shown in Fig. 2;

Fig. 5 is a fragmentary sectional view taken on line 5—5 of Fig. 3;

Fig. 6 is a fragmentary sectional view taken on line 6—6 of Fig. 2;

Fig. 7 is a fragmentary view taken on line 7—7 of Fig. 2; and

Fig. 8 is a fragmentary side view as viewed from the right in Fig. 2.

Referring to the drawings which illustrate the preferred embodiment of the invention, and particularly to Fig. 1, the numeral 10 designates a pump connected with a supply conduit 12 leading to a source of water, such as a well. The nature of the pump is not important, and any type of water pump may be provided, including a type in which the pump is submerged within the well. A conduit 14 is connected to the outlet of the pump and to the inlet of a storage tank 16, preferably located near the bottom of the storage tank 16. The storage tank will be of the type which is closed or sealed at its upper portion so that the liquid level 18 therein will be located below the top 20 of the tank and will trap within the chamber portion 22 above the water, an air cushion or body of air. The outlet 24 of the tank is also located near the bottom of the tank. My new control 26 is connected to the tank below the normal water level 18 thereof or to the line 14, and includes a switch connected by lead 28 to the motor 30 of the pump 10 and connected by lead 32 to a source of electric power.

My control 26 employs a chambered housing part 34. The housing part preferably is open at both ends thereof and has an integral internal structure including walls 36 partially defining a chamber 38. The internal structure has a tapped bore 40 at which is connected a conduit 42 communicating with the water supply tank 16 and serving as the means for supporting the control 26 and connecting it to the tank 16. The internal structure includes means defining a passage connecting chamber 38 with a chamber 54 in housing 34. As here shown the internal structure has a central hub portion 44 having a bore 46 extending therethrough, and further includes a laterally or substantially radially projecting tubular portion 48 extending from the bore 46 to a substantially longitudinal bore 50 located in the outer wall portion of the housing 34. A tubular projection 52 extends outwardly from the housing 34. The chamber 54 is defined in part by an end plate 56 detachably secured to the housing 34 by securing members 58, and preferably sealed by a gasket 60. The plate 56 and the opposed transverse portion of the internal structure, including the wall 36 which defines the chamber 38, serve to close the chamber 54. Wall 36 preferably includes inwardly offset or recessed portion 62.

A dome-shaped end member or second housing part 64 has its marginal portion 66 secured to the marginal portion of the housing part 34 by screws or other securing members 68. The dome-shaped portion includes a stepped or offset portion 70 comparable to the offset at 62 in the wall 36, as best seen in Fig. 3. The member 64 preferably has a tapped bore 72 therein substantially coaxial with the bore 46 in the housing part 34. A screw-threaded plug 74 seats in the tapped bore 72 and has an axial bore 76 slidably receiving a pin 78. The pin 78 projects into the interior of the domelike housing plate 64 and is connected to a hub portion 80 at the center of a substantially rigid disk or portion 82 which is marginally connected with an annular flexible outer diaphragm part 84. The diaphragm part 84 may be formed of rubber, synthetic rubber or other suitable material which is clamped at its margin between the marginal portion 66 of the dome part 64 and the marginal part of the housing part 34. The diaphragm 82, 84 cooperates with the housing part 64 to define an air intake chamber 86 separated from the chamber 38 by the diaphragm. A coil spring 88 bears at one end against the rigid diaphragm part 82 and at its opposite end against the plug 74 to normally urge the diaphragm to the position shown in Fig. 3. The spring 88 will be suitably calibrated to regulate the pressure thereof which resists displacement of the diaphragm from the Fig. 3 position to the opposed position within the offset portion 70 of the end plate 64. The rigid diaphragm part 82 will preferably include a flat plate portion 83 at the part thereof open at the chamber 38 and substantially central of said diaphragm.

The bore 46 in the internal structure portion 44 of the housing 34 preferably includes a reduced dimension internally screw-threaded end portion spaced outwardly from the tubular portion 48 and adapted to receive a reduced screw-threaded end portion 90 of a cylindrical member or plug 92 preferably provided with an enlarged head portion 94 projecting into the expansible chamber 38. Head 94 has a flat transverse end surface against which the bodily shiftable diaphragm portion 82, 83 is adapted to be pressed by the spring 88, as illustrated in Fig. 3, to define the contracted condition of said expansible chamber. The plug member 92 has an axial bore 96 open at the end thereof engaged by diaphragm member 83 and communicating with a cross-bore 98 at its inner end, which cross-bore 98 communicates with a circumferential groove 100, and in turn with the bore of the tubular portion 48 of the housing 34. Circumferential seals 102 and 104 encircle the plug 92 at opposite sides of the circumferential groove 100. As here illustrated the seals 102 and 104 are preferably resilient annular members of the type known as O-rings seated in a groove in one of the members, such as the plug 92, and of a cross-sectional size greater than the depth of the groove to insure sealing contact with plug 92 and internal structure 44 of housing 34.

The portion of the housing part 34, from which the projection 52 extends and in which the opening 50 is formed, is preferably enlarged or of increased thickness at 106 and has a passage 108 formed therein spaced from the passage 50 but communicating therewith through a recess 110 in the face of the part 34 engaged by the diaphragm 84 so water can flow from passage 50 to passage 108. The passage 108 has a restricted or jet portion 112 intermediate its ends and discharges at 114 into the air-entraining water chamber 54. The outer wall of the portion 106 in which the passage 108 is formed, and which constitutes the bottom of the tubular or cup-shaped projection 52, is characterized by a recess central portion 116, here shown as substantially conical. An aperture 118 formed in the wall 106 provides communication between the center of the recessed wall portion 116 and the restricted or jet portion 112 of the passage 108.

An inner valve plug member 120 seats in the inner portion of the tubular projection 52 to clamp the margin of a valve diaphragm 122 having a central aperture which normally fits constrictively around a central tapered projection 124 of the valve plug 120, so as to provide a sealed fit therewith. The diaphragm is preferably formed of rubber or synthetic rubber capable of deflection away from projection 124 and into the recess 116 in response to pressure exerted at the bottom thereof, as illustrated in Figs. 5 and 6, through passages 126 alongside the projection 124. Passages 126 communicate with a cross-passage 128 in plug 120, which preferably communicates with an enlarged circumferential channel 130 formed in said plug 120. Channel 130 communicates with a passage 132 formed in the projection 52 perpendicular to the diaphragm 84. An aperture 134 is formed in diaphragm 84 in register with passage 132. The marginal portion 66 of the dome part 64 has a recess 136 leading from the interior of the dome to the registering apertures 134 and 132, as seen in Fig. 7. Thus disc 122 forms a check valve in an air transfer means or passage between air chamber 86 and water chamber 54.

A plug 140 is screw-threaded in the outer end of tubular projection 52 and marginally clamps an outer diaphragm 142 between the same and the plug 120. The diaphragm 142 has a central aperture fitting around a tapered central projection 144 of the plug 140 and projecting into a central passage 146 at the outer end of the plug 120 which communicates with the passage 128 of the plug 120. The diaphragm 142 is flexible and resilient and is preferably formed of rubber or synthetic rubber. An annular recess 148 surrounds the projection 144 and an air inlet passage 150 communicates with the recess 148. Disc 142 thus forms a check valve in an air inlet passage open to atmosphere and connected to an intermediate part of the air transfer passage described above. Bores 128, 130, 132, 134 and 136 constitute a common part of both the air intake passage and the air transfer passage from which branch the passages containing the check valve disks 122 and 142.

The bore of the tubular portion 48 is preferably enlarged and screw-threaded outwardly of the passage 50 and is closed by a plug 152 which seals the passage against leakage of air or liquid therefrom to atmosphere.

The dome 64 preferably includes an integral projecting housing portion 160 slotted at 162. The housing portion 160 serves to receive and mount a switch 164 to which the leads 28 and 32 are connected. The switch 164 includes an elongated actuator member 166 extending through the slot 162 into engagement with the outer end of the pin 78 at 168. The switch is so constructed and adjusted that it is closed when the parts are in the position illustrated in Fig. 3 with the diaphragm 82, 83 seated against the end portion 94 of the plug 92 and is opened to break the circuit leading to the pump motor 30 when it reaches a position substantially spaced from the diaphragm position shown and one in which a substantial compression of the spring 88 will have occurred.

In the installation of this device in a water system, as illustrated in Fig. 1, the spring 88 of the device will be selected to operate in accord with the desired limits of pressure which are to characterize the functioning of the system. Thus the spring will be capable of assuming the extended position shown in Fig. 3 against a pressure equal to the minimum pressure to be maintained in the storage tank 16 and will yield to permit movement of the diaphragm and the switch-actuating pin 78 to switch-opening position at the pressure selected as the maximum pressure to occur within the storage tank. In domestic water systems, the maximum pressure is usually in the order of forty pounds per square inch, and the minimum pressure is in the order of twenty pounds per square inch. The device permits some calibration of the pressure limits after assembly. Thus the plug 74 against which the spring 88 presses at one end is screw-threaded at 72 and may be adjusted axially in its tapped bore to change the spring pressure acting on spring 88. Another adjustment is accommodated by the screw-threaded portion 90 of the plug 92 which accommodates adjustment of the position of the diaphragm-engaging surface relative to the parting plane between the housing part 34 and the margin of the dome part 64.

After assembly and installation of the mechanism, as illustrated in Fig. 1, and the desired adjustment or calibration of the spring 88, the device operates substantially as follows. When the pressure within the tank 16 has been reduced by withdrawing water through the outlet conduit 24 to thereby lower the level of the liquid 18 and increase the volume of the air cushion 22 thereabove, the spring 88 presses the diaphragm 82, 83 to seat against the end 94 of the member 92 and permit the switch actuator 166 to move a closed-circuit position. When the switch 164 closes, a circuit to the pump motor is closed, thereby operating the pump 10 to supply water through conduit 14 to the storage tank 16.

As the amount of water contained in tank 16 increases, the liquid level 18 rises and the air cushion space 22 reduces in volume to compress the air and increase the pressure in the tank 16. The increase in pressure in the tank acts against the diaphragm 82 and unseats the same from plug head 94 against the action of the spring 88 to expand the chamber 38. This permits flow of water from chamber 38 into passage 96 to flow through tube 48, passage 50, recess 110, passage 108 and jet 112 for discharge into air-entraining chamber 54. This water-flow jet 112 assists to entrain air in chamber 54 through the air transfer passage from the air intake chamber 86. Air entrainment is also assisted by the action of the diaphragm 82 moving bodily into the chamber 86 of the dome 64 to reduce the volume of that chamber and displace air therefrom through air transfer passage defining bores 136, 134, 132, 128 and 126, past the unseated diaphragm 122, and through bore 118 into water passage 108 at jet 112. During this air-entraining flow in the air transfer passage the pressure in the chamber 126 acts against the check valve diaphragm 142 in the air inlet branch leading to atmosphere to press the same outwardly and to seat the same firmly and sealingly around the valve projection 144 to insure against release of the air to atmosphere.

This air transfer or entraining action continues until the diaphragm 82 moves to the extent necessary to open the switch 164 and stop operation of the motor 30 of the pump 10. When this occurs it will be observed that the diaphragm 82 will be held spaced from the abutment plug 94 so that the water flow passage between the air-entraining chamber 54 and the water intake chamber 38 is open. Thus the air entrained in the water in chamber 54 can find its way through the open water flow passage between chambers 54 and 38 and thence through pipe 42 into the tank 16 during the time that the diaphragm 82 remains spaced from the abutment 94.

After the operation of the pump motor has stopped as a result of maximum displacement of diaphragm 82 from the position shown in Fig. 3, the diaphragm 82 will be pressed progressively toward the Fig. 3 position by the spring 88 as the volume of water within the tank 16 is reduced by opening the valves of the system. Movement of the diaphragm 82 toward the Fig. 3 position entails an increase in the volume of the chamber 86 within the dome 64, thereby creating a suction within chamber 86 acting upon the diaphragm 142 in the air inlet passage to unseat the diaphragm 142 from the projection 144 and permit the entry of air from atmosphere through passage 150, recess 148, the aperture of the diaphragm 142, and the bores 146, 128, 130, 132, 134 and 136 into the chamber 86. This occurs at a time when the diaphragm 122 is responsive to the water pressure within the chamber 54 and the passage 108 which exceeds atmospheric air pressure and therefore said diaphragm 122 is held in sealed engagement with the valve projection 124. Consequently, the diaphragm 122 prevents leakage of water from the chamber 54 into the air transfer passage and air intake chamber 86 during the time that the diaphragm 82 is moving in a direction to draw air from atmosphere into the chamber 86. By the time the diaphragm 82 reaches the position shown in Fig. 3, the volume of air within the chamber 86 in the dome 64 will have been replenished. Consequently subsequent reverse operation of the diaphragm 82 in response to increase of water pressure after the switch again closes the pump motor will permit forcing of a part of that new air charge into the chamber 54 in the manner first described.

As a result of the pumping of air into this device incident to each cycle of opening and closing of the pump motor 30, it will be apparent that small quantities of air are fed into the system and into the storage tank periodically. The amount of air so fed into the system insures that the quantity of air within the storage tank will always be adequate to maintain a pressure head of trapped compressed air within the tank 10. Consequently, the danger of loss of an effective air cushion which sometimes occurs in domestic water systems is effectively overcome and eliminated by this device.

Two of the outstanding characteristics of this device are readily apparent from the foregoing description. The first of these is the functioning of a single unit to control a pump motor in response to pressure variations in the water storage tank and to produce periodic entrainment of air in the water tank to maintain the volume of the air cushion. The second outstanding characteristic is the employment of the water pressure in the water tank, and particularly variations in water pressure in the tank, as the means for causing entrainment of air into the water contained in the system. These two characteristics greatly simplify the operation and functioning of a domestic water system, result in simplicity of construction of such systems, insure a constant and adequate volume of air in the air cushion, reduce maintenance requirements, and possess other advantages as are apparent from the foregoing description.

While the construction described above is preferred, it will be understood that the internal structure in housing part 34 may be omitted, thus providing only a single expansible chamber in part 34 to which the air transfer passage from the air intake chamber opens directly.

While the preferred embodiment of the invention has been illustrated and described, it will be understood that changes in the construction may be made within the scope of the appended claims without departing from the spirit of the invention.

I claim:

1. A controller for a water system having a motor driven supply pump and a water storage tank having a trapped cushion of air under pressure, comprising a two-part housing, a spring pressed diaphragm clamped between the parts of said housing, a switch carried by said housing, means connected to said diaphragm for actuating said switch and controlling said pump motor, means for connecting one part of said housing to said tank to subject said diaphragm to the pressure in said tank, air inlet means communicating with the other part of said housing and including a check valve, and air transfer means connecting said housing parts and including a check valve for admitting air to said tank-connected housing part.

2. A controller for a water system having a motor driven supply pump and a water storage tank having a trapped cushion of air under pressure, comprising a two-part housing, a spring pressed diaphragm clamped between the parts of said housing, a switch carried by said housing, means connected to said diaphragm for actuating said switch and controlling said pump motor, means for connecting one part of said housing to said tank to apply the pressure in said tank against said diaphragm, air inlet means communicating with the other part of said housing and including a check valve, and air transfer means connecting said housing parts and including a water flow passage connected to said tank-connected housing part and provided with a jet juxtaposed to an air passage, movement of said diaphragm accommodating water flow in said water passage, and a check valve in said air passage.

3. A controller for a water system having a motor driven supply pump and a water storage tank having a trapped cushion of air under pressure, comprising a two-part housing, a spring-pressed diaphragm clamped between the parts of said housing, a switch carried by said housing, means carried by said diaphragm for actuating said switch and controlling said pump motor, means for connecting one part of said housing to said tank to apply the pressure in said tank against said diaphragm, air inlet means communicating with the other part of said housing and including a check valve, air transfer means connecting said housing parts and including a check valve for admitting air to said tank-connected housing part, and adjustable means for varying the spring pressure exerted on said diaphragm in opposition to the pressure in said tank.

4. A controller for a water system having a motor driven supply pump and a water storage tank having a trapped cushion of air under pressure, comprising a two-part housing, a spring-pressed diaphragm clamped between the parts of said housing, a switch carried by said housing, means carried by said diaphragm for actuating said switch and controlling said pump motor, means for connecting one part of said housing to said tank to subject said diaphragm to the pressure in the tank, air inlet means communicating with the other part of said housing and including a check valve responsive to the pressure in said other housing part, air transfer means connecting said housing parts and including a check valve responsive to a diaphragm controlled water flow for admitting air to said tank-connected housing part, said air inlet means and air transfer means including a common passage portion from which extend a pair of branch passage portions mounting said respective check valves.

5. A controller for a water system having a motor driven water pump and a water storage tank having a trapped cushion of air under pressure, comprising a housing adapted to be connected to said tank, a flexible diaphragm spanning said housing to define a water chamber and an air chamber and responsive to pressure in said tank, a motor control switch carried by said housing, means responsive to movement of said diaphragm for actuating said switch, spring means in said chamber pressing on said diaphragm in opposition to the pressure in said water chamber, means responsive to movement of said diaphragm by said spring to supply atmospheric air into said air chamber, and means responsive to movement of said diaphragm upon an increase in water pressure in said water chamber for transferring air from said air chamber to said water chamber.

6. A controller for a water system having a motor driven water pump, and a water storage tank having a trapped cushion of air under pressure, comprising a housing adapted to be connected to said tank, a flexible diaphragm spanning said housing to define a water chamber and an air chamber and responsive to pressure in said tank, a motor control switch carried by said housing, means responsive to movement of said diaphragm for actuating said switch, spring means in said air chamber pressing on said diaphragm in opposition to the pressure in said water chamber, means responsive to movement of said diaphragm by said spring to supply atmospheric air into said air chamber, and means responsive to flow of water in said water chamber upon movement of said diaphragm for transferring air from said air chamber to said water chamber.

7. A controller for a water system having a motor driven water pump and a water storage tank having a trapped cushion of air under pressure, comprising a housing adapted to be connected to said tank, a diaphragm flexibly responsive to pressure in said tank and spanning said housing to define a water chamber and an air chamber, a motor control switch carried by said housing, means responsive to flexing of said diaphragm for actuating said switch, spring means in said air chamber pressing on said diaphragm in opposition to the pressure in said water chamber, means responsive to flexing of said diaphragm in one direction by said spring to supply atmospheric air into said air chamber, jet passage means for guiding flow of water in said water chamber upon flexing of said diaphragm, said housing having a passage connecting said air chamber to said jet passage, and a check valve in said last named passage.

8. A controller for a water system having a motor driven water pump and a water storage tank having a trapped cushion of air under pressure, comprising a housing including a shiftable part and defining an expansible chamber, means connecting said chamber to said tank for response of said shiftable housing part to the pressure in said tank, means urging said shiftable part in chamber-contracting direction and in opposition to tank pressure, a pump-controlling switch carried by said housing, means carried by said shiftable chamber-defining part for actuating said switch, and means responsive to chamber-expanding movement of said shiftable part for introducing air into said chamber.

9. A controller for a water system having a motor driven water pump and a water storage tank having a trapped cushion of air under pressure, comprising a housing adapted to be connected to said tank, a partition in said housing defining in said housing an air-entraining chamber and an air intake chamber said partition being defined in part by a shiftable member responsive to the pressure in said tank, means urging said shiftable member in a direction to contract said entraining chamber, a pump-controlling switch carried by said housing, means carried by said shiftable part for actuating said switch, means responsive to movement of said shiftable part to expand said intake chamber for introducing air into said intake chamber, and means responsive to movement of said shiftable part for transferring air from said intake to said entraining chamber and including a passage in which water flows upon change of size of said entraining chamber and having a restriction therein at which an air inlet opening communicates.

10. A controller for a water system having a motor driven water pump and a water storage tank having a trapped cushion of air under pressure, comprising a housing adapted to be connected to said tank, a flexible diaphragm responsive to the pressure in said tank and defining two compartments, a partition in the compartment of said housing connected to said tank and defining an air-entraining chamber and a water intake chamber defined in part by said diaphragm, means urging said diaphragm in direction to contract said intake chamber, a pump-controlling switch carried by said housing, means carried by said diaphragm for actuating said switch, a passage connecting said chambers and having a restriction, an air inlet passage communicating with said passage at said restriction, and a check valve in said air inlet passage, said diaphragm spanning and closing said chamber connecting passage in one position.

11. A controller for a water system having a motor driven water pump and a water storage tank having a trapped cushion of air under pressure, comprising a housing having a shiftable part responsive to the pressure in said tank, a partition in said housing separating an air-entraining chamber and an expansible intake chamber said intake chamber being adapted to be connected to said tank and being defined in part by said shiftable part, means urging said shiftable part in direction to contract said intake chamber, a pump-controlling switch carried by said housing, means carried by said shiftable part for actuating said switch, and means responsive to movement of said shiftable part for introducing air into air-entraining chamber, said last named means including a passage connecting said chambers and having a restriction therein at which an air inlet opening communicates, a dome member secured to said housing and cooperating with said shiftable housing part to define an air chamber, said air inlet opening communicating with said air chamber, a check valve in said inlet opening, an air supply passage leading to said dome member, and a check valve in said last named passage.

12. A controller for a water system having a motor driven water pump and a water storage tank having a trapped cushion of air under pressure, comprising a housing adapted to be connected to a tank, a diaphragm responsive to tank pressure and spanning said housing to define a water chamber and an air chamber, a motor control switch carried by said housing, means carried by and responsive to movement of said diaphragm for actuating said switch, spring means in said air chamber pressing on said diaphragm in opposition to the pressure in said water tank, said housing having a passage open to atmosphere and branch passages leading from said first passage to the air and water chambers, respectively, a check valve in the branch passage leading to said water chamber and a second check valve in the passage open to atmosphere.

13. A controller for a water system having a motor driven water pump and a water storage tank having a trapped cushion of air under pressure, comprising a housing adapted to be connected to a tank, a diaphragm responsive to tank pressure and spanning said housing to define a water chamber and an air chamber, a motor control switch carried by said housing, means carried by and responsive to movement of said diaphragm for actuating said switch, spring means in said air chamber pressing on said diaphragm in opposition to the pressure in said water tank, said housing having a passage open to atmosphere and branch passages leading from said first passage to the air and water chambers, respectively, a check valve in the branch passage leading to said water chamber and a second check valve in the passage open to atmosphere, said check valves each constituting a resilient disc anchored at its margin and spanning a passage, said disc having an opening spaced from its margin, and a tapered projection fitting in said disc opening and normally sealing the same.

References Cited in the file of this patent
UNITED STATES PATENTS

| | | |
|---|---|---|
| 2,288,437 | Conery et al. | June 30, 1942 |
| 2,416,345 | Piccardo | Feb. 25, 1947 |
| 2,435,053 | Piccardo et al. | Jan. 27, 1948 |
| 2,621,595 | Burks | Dec. 16, 1952 |
| 2,647,466 | Nash | Aug. 4, 1953 |
| 2,822,121 | Sadler et al. | Feb. 4, 1958 |